United States Patent
Heo

(10) Patent No.: US 12,368,595 B2
(45) Date of Patent: Jul. 22, 2025

(54) METHOD AND APPARATUS FOR VERIFYING VALIDITY OF TRANSACTIONS AND BLOCKS

(71) Applicant: ELECTRONICS AND TELECOMMUNICATIONS RESEARCH INSTITUTE, Daejeon (KR)

(72) Inventor: Hwanjo Heo, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 375 days.

(21) Appl. No.: 17/734,273

(22) Filed: May 2, 2022

(65) Prior Publication Data

US 2022/0368532 A1  Nov. 17, 2022

(30) Foreign Application Priority Data

May 11, 2021 (KR) .......................... 10-2021-0060908

(51) Int. Cl.
| | |
|---|---|
| G06F 9/46 | (2006.01) |
| H04L 9/00 | (2022.01) |
| H04L 9/32 | (2006.01) |

(52) U.S. Cl.
CPC .......... H04L 9/3236 (2013.01); G06F 9/466 (2013.01); H04L 9/50 (2022.05)

(58) Field of Classification Search
CPC ....... H04L 9/3236; H04L 9/50; H04L 9/3218; H04L 43/16; H04L 63/12; H04L 63/1458; G06F 9/466
See application file for complete search history.

(56) References Cited

U.S. PATENT DOCUMENTS

| | | | |
|---|---|---|---|
| 2015/0348017 A1 | 12/2015 | Allmen | |
| 2019/0182029 A1 | 6/2019 | Yim et al. | |
| 2020/0092084 A1* | 3/2020 | Maroney | ............... H04L 9/3239 |
| 2020/0403776 A1 | 12/2020 | Oh et al. | |
| 2021/0256027 A1* | 8/2021 | Murao | ............... G06Q 20/0658 |
| 2021/0365948 A1* | 11/2021 | Briscombe | ........... G06Q 20/065 |
| 2021/0385068 A1 | 12/2021 | Oh | |
| 2022/0100733 A1* | 3/2022 | Tock | ..................... H04L 9/3239 |

FOREIGN PATENT DOCUMENTS

| | | |
|---|---|---|
| KR | 10-2017-0061891 A | 6/2017 |
| KR | 10-2019-0075495 A | 7/2019 |
| KR | 10-2020-0014682 A | 2/2020 |
| KR | 10-2020-0051404 A | 5/2020 |
| KR | 10-2020-0057356 A | 5/2020 |
| KR | 10-2020-0107769 A | 9/2020 |
| WO | 2019/101232 A2 | 5/2019 |

\* cited by examiner

*Primary Examiner* — Lynn D Feild
*Assistant Examiner* — Vladimir I Gavrilenko
(74) *Attorney, Agent, or Firm* — LRK PATENT LAW FIRM

(57) ABSTRACT

An apparatus for verifying validity of transactions and/or blocks includes: a processor, a memory, and a communication device, wherein the processor executes a program stored in the memory to perform: verifying validity of a predetermined number of transactions and/or blocks among a plurality of transactions and/or blocks received from at least one peer in a blockchain system; and determining an increase or a decrease of the predetermined number according to a verification result of the predetermined number of transactions and/or blocks is provided.

9 Claims, 8 Drawing Sheets

FIG. 1
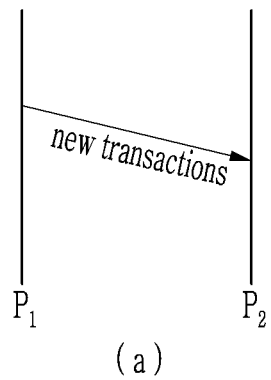
(a)
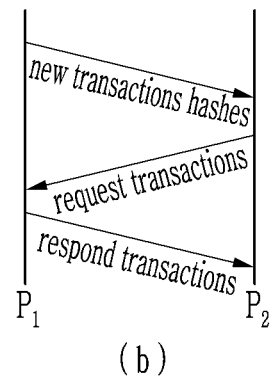
(b)
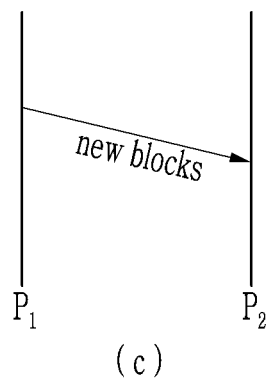
(c)
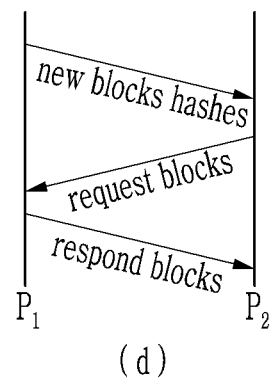
(d)
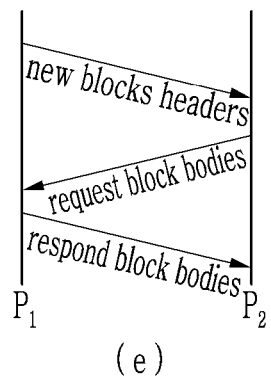
(e)
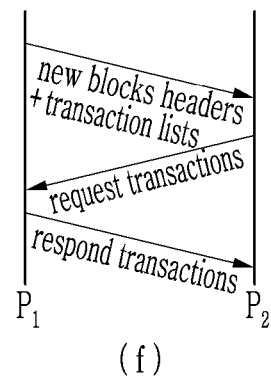
(f)
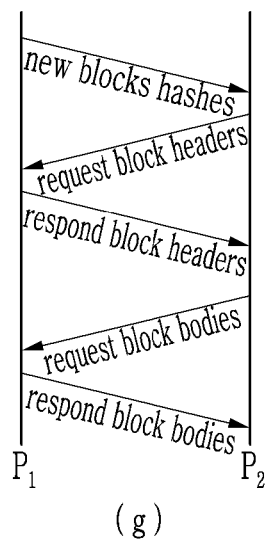
(g)

FIG. 3

```
Txs: list of transactions received from Peer[i]
activeMitigation: boolean variable indicating if aggressive mitigation is in need
TxsToProcess = { } for tx in Txs:                          // Iterate all transactions in Txs
   Add(tx.hash, Peer[i].KnownTxs).      // Mark this tx is known by the peer
   if tx in Global.InvalidPermanentTxs: // skip if tx was invalid-permanent
      continue
   if activeMitigation && tx in Global.InvalidTemporaryTxs:
      continue                          // In case of active mitigation
                                        // skip invalid-temporary txs
   Insert(tx, TxsToProcess).            // Insert tx to process if not known
Process(TxsToProcess)                   // Process tx in TxsToProcess
```

FIG. 4

```
Blks: list of blocks received from Peer[i]
activeMitigation: boolean variable indicating if aggressive mitigation is in need
BlksToProcess = { } for blk in Blks:                          // Iterate all blocks in Blks
   if blk in Global.InvalidPermanentBlks: // skip if blk was invalid-permanent
      continue
   if activeMitigation && blk in Global.InvalidTemporaryBlks:
      continue                            // In case of active mitigation
                                          // skip invalid-temporary blks
   Insert(blk, BlksToProcess).            // Insert blks to process if not known
Process(BlksToProcess)                    // Process blks in TxsToProcess
```

FIG. 6

```
Txs: list of transactions received from Peer[i]
n: number of transactions to process
THRESH: proportion of valid transactions to increase n
incrementStep: number of transactions to increase n
decrementFactor: multiplicative factor to decrease n
TxsToProcess = { }

Loop:                                    // transaction processing loop
   for tx in rand(Txs):                  // Iterate transaction in Txs randomly
      if len(TxsToProcess) < n:
         Insert(tx, TxsToProcess)        // Insert tx to process nInvalid = Process(TxsToProcess)      // Process tx in TxsToProcess if nInvalid/len(TxsToProcess) < THERSH:
      n = min(n + incrementStep, nMax)   // Additive increase
   else:
      n = max(n * decrementFactor, nMin) // Multiplicate decrease
```

FIG. 7

```
Txs: list of transactions received from Peer[i]
n: number of transactions to process
THRESH: proportion of valid transactions to increase n
incrementStep: number of transactions to increase n
decrementFactor: multiplicative factor to decrease n
activeMitigation: boolean variable indicating if aggressive mitigation is in need
TxsToProcess = { }

Loop:                                              // transaction processing loop
   nInvalid = 0
   for tx in rand(Txs):                            // Iterate transaction in Txs randomly
      Add(tx.hash, Peer[i].KnownTxs).              // Mark this tx is known by the peer
      if len(TxsToProcess) < n:
         if tx in Global.InvalidPermanentTxs:      // skip if tx was invalid-permanent
            nInvalid++
            continue
         if activeMitigation && tx in Global.InvalidTemporaryTxs:
            nInvalid++
            continue
         Insert(tx, TxsToProcess)                  // Insert tx to process nInvalidProcessed = Process(TxsToProcess)       // Process tx in TxsToProcess if (nInvalid+nInvalidProcessed)/(len(TxsToProcess)+nInvalid) >= THERSH:
      n = min(n + incrementStep, nMax)    // Additive increase
   else:
      n = max(n * decrementFactor, nMin)  // Multiplicate decrease
```

METHOD AND APPARATUS FOR VERIFYING VALIDITY OF TRANSACTIONS AND BLOCKS

CROSS-REFERENCE TO RELATED APPLICATION

This application claims priority to and the benefit of Korean Patent Application No. 10-2021-0060908 filed in the Korean Intellectual Property Office on May 11, 2021, the entire contents of which are incorporated herein by reference.

BACKGROUND OF THE INVENTION

1. Field of the Invention

This description relates to a method and apparatus for verifying the validity of the transactions and blocks of the blockchain system.

2. Description of Related Art

Blockchain systems are widely used today because they can provide a transparent and irreversible (immutable) ledger of transactions. The blockchain system can be set up in a variety of ways. Only registered users can generate transactions in a private blockchain, whereas anyone can transmit transactions on the blockchain network without restriction in a public blockchain. In terms of issuance (or mining) of blocks, in a permissioned blockchain system, a block can be created only by a designated set of block issuers (or miners) and in a permissionless blockchain system, anyone can participate in the issuance of blocks.

In a public blockchain or permissionless blockchain system, fundamentally, blocks and transactions are not disseminated by a trusted entity. That is, the blocks and transactions are exchanged between a variety of peers on the blockchain network, and the delivered blocks and transactions need to be verified. Due to the nature of openness and no inexistence of trusted entity, forms of Denial-of-Service attacks (DDoS) in which a plurality of peers continuously deliver potentially invalid blocks or transactions may occur. This type of attack is similar to how difficult it is for the web server to distinguish between a benign and a malicious request for a denial of service attack among the requests delivered from various web clients in the web service. Fundamentally, the problem is difficult to solve.

The above information disclosed in this Background section is only for enhancement of understanding of the background of the invention, and therefore it may contain information that does not form the prior art that is already known in this country to a person of ordinary skill in the art.

SUMMARY OF THE INVENTION

An embodiment provides an apparatus for verifying validity of transactions and/or blocks.

Another embodiment provides an apparatus for verifying validity of a transaction.

Another embodiment provides a method for verifying validity of transactions and/or blocks.

According to an embodiment, an apparatus for verifying the validity of transactions and/or blocks is provided. The apparatus includes: a processor, a memory, and a communication device, wherein the processor executes a program stored in the memory to perform: verifying validity of a predetermined number of transactions and/or blocks among a plurality of transactions and/or blocks received from at least one peer in a blockchain system; and determining an increase or a decrease of the predetermined number according to a verification result of the predetermined number of transactions and/or blocks.

When determining an increase or a decrease of the predetermined number according to a verification result of the predetermined number of transactions and/or blocks, the processor may perform: comparing a ratio of valid transactions and/or blocks among the verified transactions and/or blocks with a predetermined threshold; and determining the increase or the decrease of the predetermined number based on the comparison result of the ratio of the valid transactions and/or blocks and the predetermined threshold.

When determining the increase or the decrease of the predetermined number based on the comparison result of the ratio of the valid transactions and/or blocks and the predetermined threshold, the processor may perform decreasing the predetermined number when the ratio of the valid transactions and/or blocks is less than the predetermined threshold.

The processor may execute the program to further perform: verifying the decreased number of transactions and/or blocks; and determining the increase or the decrease of the decreased number according to the verification result of the decreased number of transactions and/or blocks.

When determining the increase or the decrease of the predetermined number based on the comparison result of the ratio of the valid transactions and/or blocks and the predetermined threshold, the processor may perform increasing the predetermined number when the ratio of the valid transactions and/or blocks is not less than the predetermined threshold.

The processor may execute the program to further perform: verifying the increased number of transactions and/or blocks; and determining the increase or the decrease of the increased number according to the verification result of the increased number of transactions and/or blocks.

The processor may execute the program to further perform, before the verifying of the validity of the predetermined number of the transactions and/or blocks, checking whether the received transactions belongs to a membership list, wherein when verifying validity of a predetermined number of transactions and/or blocks, the processor may perform verifying the validity of the predetermined number of the transactions when the received transactions do not belong to the membership list.

The membership list may include at least one of a membership list of permanently invalid transactions and a membership list of temporarily invalid transactions.

When verifying validity of a predetermined number of transactions and/or blocks among a plurality of transactions and/or blocks received from at least one peer in a blockchain system, the processor may perform verifying the validity of the predetermined number of transactions and/or blocks based on a plurality of predetermined validity criteria.

The plurality of predetermined validity criteria may include an independent criterion on a current state of the transactions and/or blocks and a dependent criterion on the current state of the transactions and/or blocks.

According to another embodiment, an apparatus for verifying validity of a transaction is provided. The apparatus includes: a processor, a memory, and a communication device, wherein the processor executes a program stored in the memory to perform: checking whether a transaction received from at least one peer in a blockchain system is included in a membership list; and verifying the transaction when the transaction is not included in the membership list.

The membership list may include at least one of a membership list of permanently invalid transactions and a membership list of temporarily invalid transactions.

The membership list of the permanently invalid transactions may include a hash value of a transaction determined to be invalid according to an independent validity criterion on a current state of the transaction.

The membership list of the temporarily invalid transactions may include a hash value of a transaction determined to be invalid according to a dependent validity criterion on a current state of the transaction.

When verifying the transaction when the transaction is not included in the membership list, the processor may perform: verifying a predetermined number of transactions among the received transactions; and determining an increase or a decrease of the predetermined number according to a verification result of the predetermined number of transactions.

When determining an increase or a decrease of the predetermined number according to a verification result of the predetermined number of transactions, the processor may perform: comparing a ratio of valid transactions among the verified transactions with a predetermined threshold; and determining the increase or the decrease of the predetermined number based on the comparison result of the ratio of the valid transactions and the predetermined threshold.

When determining the increase or the decrease of the predetermined number based on the comparison result of the ratio of the valid transactions and the predetermined threshold, the processor may perform decreasing the predetermined number when the ratio of the valid transactions is less than the predetermined threshold.

When determining the increase or the decrease of the predetermined number based on the comparison result of the ratio of the valid transactions and the predetermined threshold, the processor may perform increasing the predetermined number when the ratio of the valid transactions is not less than the predetermined threshold.

According to yet another embodiment, a method for verifying validity of transactions and/or blocks is provided. The method includes: checking whether a transaction and/or a block received from at least one peer in a blockchain system is included in a membership list; verifying validity of a predetermined number of the transaction and/or block among the transactions and/or blocks when the transaction and/or block is not included in the membership list; and determining an increase or a decrease of the predetermined number based on a verification result of predetermined number of the transaction and blocks.

BRIEF DESCRIPTION OF THE DRAWINGS

FIG. 1 is a diagram illustrating a method for delivering a block and a transaction according to an embodiment.

FIG. 3 shows a pseudo code illustrating a method for defending an attack using an invalid transaction or block according to an embodiment.

FIG. 4 shows another pseudo code illustrating a method for defending an attack using an invalid transaction or block according to an embodiment.

FIG. 6 shows a pseudo code implementing a method for defending an attack using an invalid transaction or block according to another embodiment.

FIG. 7 shows a pseudo code implementing a method for defending an attack using an invalid transaction or block according to another embodiment.

DETAILED DESCRIPTION OF THE EMBODIMENTS

Figure 2:
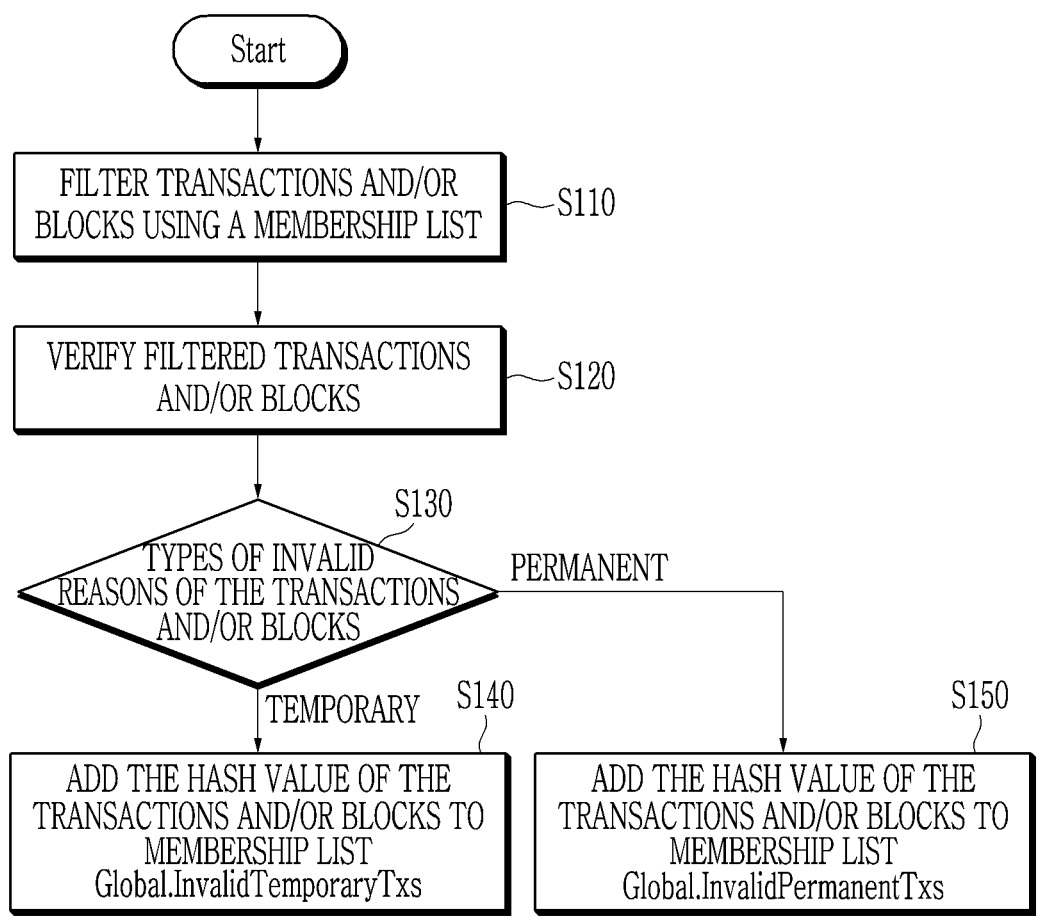
FIG. 2 is a flowchart illustrating a method for defending a service denial attack using an invalid transaction or block according to an embodiment.

In the following detailed description, only certain embodiments have been shown and described, simply by way of illustration. As those skilled in the art would realize, the described embodiments may be modified in various different ways, all without departing from the spirit or scope of the description. Accordingly, the drawings and description are to be regarded as illustrative in nature and not restrictive, and like reference numerals designate like elements throughout the specification.

Throughout the specification, unless explicitly described to the contrary, the word "comprise", and variations such as "comprises" or "comprising", will be understood to imply the inclusion of stated elements but not the exclusion of any other elements.

In this specification, expressions described in the singular may be construed in the singular or plural unless an explicit expression such as "one" or "single" is used.

As used herein, "and/or" includes each and every combination of one or more of the recited elements.

In the specification, it will be understood that, although the terms "first," "second," etc. may be used herein to describe various elements, these elements should not be limited by these terms. These terms are only used to distinguish one element from another. For example, a first element could be termed a second element, and a second element could similarly be termed a first element without departing from the scope of the present description.

In a flowchart described with reference to drawings in this specification, the order of operations may be changed, several operations may be merged, some operations may be divided, and specific operations may not be performed.

FIG. 1 is a diagram illustrating a method for delivering a block and a transaction according to an embodiment.

FIG. 1 shows a block and transaction delivery method according to each protocol. $P_1$ of FIG. 1 is a peer to transmit a block and a transaction, $P_2$ is a peer to receive a block and a transaction.

In (a) of FIG. 1, $P_1$ may transmit at least one transaction to $P_2$. In (b) of FIG. 1, $P_1$ may transmit a hash value of the at least one transaction to be transmitted to $P_2$, $P_2$ may request the at least one transaction to be received based on the hash value, and $P_1$ may deliver the at least one transaction corresponding to the at least one requested hash value. Here, $P_2$ may request a transaction from $P_1$ by using an identifier (transaction id) of the transaction determined in a predetermined manner instead of the hash value. For example, a signature value for transaction data may be used as the transaction identifier. As another example, a zero-knowledge proof value for transaction data may be used as the transaction identifier. A delivery method for an unrequested transaction (unsolicited transaction delivery scheme) is illustrated in (a) of FIG. 1 and a delivery method for a requested transaction (pooled transaction delivery scheme) is illustrated in (b) of FIG. 1.

Schematic diagrams illustrating a method for delivering a block are illustrated in (c) and (d) of FIG. 1 and may correspond to (a) and (b) of FIG. 1, respectively.

The size of the block may be generally larger than the size of the transaction and the block may include a block header and a block body. The block body may include transactions belonging to the corresponding block. Therefore, the delivery method for the un-requested transaction (an unsolicited block delivery scheme) of (c) in FIG. 1 may be configured as (e) in FIG. 1. Referring to (e) in FIG. 1, when $P_1$ first transmits the block header to $P_2$ and $P_2$ requests the block body of the received block header, $P_1$ may transmit the block body to $P_2$. In an embodiment, the block header and block body may be a plurality of block headers and a plurality of block bodies, respectively. A delivery method for the requested block (pooled block delivery scheme) of (d) in FIG. 1 may be configured in such a way that the block header and the block body are transmitted individually, as (g) in FIG. 1.

A scheme illustrated in (e) of FIG. 1 may be modified as in (f) of FIG. 1. Referring to (f) of FIG. 1, a list of transactions included in the block body (usually a list of transaction hash values or transaction identifiers (transaction id)) may be first delivered to $P_2$ along with the block header, and $P_2$ may request a transaction that is not retained in $P_2$ to $P_1$. In an embodiment, $P_2$ may request the transaction not only from $P_1$ but also from other peers. When the block body includes information other than the transaction, the information included in the block body may first be transmitted to $P_2$ together with the block header.

In a delivery method in which information is transmitted through a request as in (b), (d), (e), (f), and (g) of FIG. 1, the peer target of the request may be selected arbitrarily and different peers may be selected in successive requests. For example, referring to (g) of FIG. 1, a block header may be requested from a peer different from the peer that informed a new block hash value and a block body may be requested from a peer different from the peer that responded to the block header.

According to an embodiment, an attack using an invalid transaction and/or an invalid block may be performed as follows.

In a blockchain system, when a new transaction is generated and/or a new block is created, each blockchain node may deliver the generated/created transaction and/or block to another peer according to the delivery protocol of the block and/or transaction shown in FIG. 1. In this delivery method, a malicious node may perform a Denial-of-Service (DoS) attack that consumes the resources of other peers by continuously delivering invalid transactions and/or blocks to other peers. In particular, since anyone can create a new block in a permissionless blockchain network and anyone can generate a new transaction in a public blockchain network, one peer needs to verify and accept the transmitted transaction or block.

When receiving a block, a peer may generally first check whether the received block is a legally created block before verification of the created block. For example, in a blockchain system where Proof-of-Work (PoW) consensus is performed, a peer may first perform the PoW verification (checking whether the value of the block hash satisfies the specified difficulty condition) so that the peer can effectively prevent wastage of resources occurred by unnecessary additional verification process. It is difficult for the attacker to create an invalid block while passing the PoW verification because it requires a lot of resources to create a block that can pass the PoW verification. In a blockchain system where a designated block producer exists, it is difficult for the attacker to generate a signature for a valid block unless the secret key (private key) of the block producer is stolen.

However, in the case of the transaction, in a public with no user restrictions or a private blockchain, since stealing a key of a general user is easier than stealing a key of a block creator, the attacker can easily generate a transaction with a valid signature. In the case of an attack that consumes the resources of the blockchain node by generating a large number of such transactions, in a blockchain where transaction fees exist (e.g., Bitcoin, Ethereum) or the staking is required to generate the transaction (e.g., EOS), it is difficult to generate a large number of "valid" transactions due to the limited resource (fee or staking resource) of the attacker. Therefore, the attacker may commit the DoS (Denial-of-Service) attack that consumes the resources of the blockchain node using an "invalid" transaction or may commit a DDoS (Distributed Denial-of-Service) attack that consumes the resources of the blockchain node using an "invalid" transaction generated from a plurality of nodes.

The following describes a method that the blockchain node defend the denial of service attacks using block or transaction. The defense method for the service denial attack using block or transaction may be implemented in various forms depending on the characteristics of the blockchain system to which the defense method is applied, the ease of implementation, and the degree of response to the attack. The defense method for the service denial attack using block or transaction according to an embodiment may be implemented and applied independently, or a plurality of defense methods may be applied independently simultaneously.

FIG. 2 is a flowchart illustrating a method for defending a service denial attack using an invalid transaction or block according to an embodiment.

A blockchain node may process unknown transactions and blocks, except for already known transactions and blocks, when at least one transaction and block is received. In general, the known transaction may be determined to be valid in the past and may be determined as a transaction included in a transaction pool, and the known block may be determined to be valid in the past and may be a block existing in a structure where the blockchain is stored (tree, directed acyclic graph (DAG), or list). In an embodiment, when it is determined that the transaction and block are invalid through the verification of the transaction and block, the invalid transaction and block may be also determined to be already known, so that the invalid transaction and block may not be unnecessarily double-verified.

Below, a method that uses "membership list" to prevent unnecessary double-validation of the invalid transactions and/or blocks is described.

Referring to FIG. 2, a blockchain node according to an embodiment may filter transactions and/or blocks received from other peers in a blockchain system using a membership list (S110).

The membership list according to the embodiment may be implemented using various data structures as a data structure in which confirmation of existence/non-existence (i.e., membership test) can be performed. For example, a bloom filter, map, or hash table structure may be utilized as the membership list. The membership list may have a predetermined maximum size limit, and when the membership list reaches the size limit, members previously included in the membership list may be removed according to various eviction methods. For example, by a FIFO (First-In-First-Out) method, the member which first belongs to the list may be deleted from the membership list first. As another example, the last member included in the membership list may be removed from the membership list by the least recently used (LRU) method.

The blockchain node according to an embodiment may use a transaction membership list in table 1 below to filter out invalid transactions. Referring to Table 1, the transaction membership list for filtering invalid transactions may include four membership lists, Peer[i].KnownTxs, Global.PooledTxs, Global.InvalidPermanentTxs, and Global.InvalidTemporaryTxs.

TABLE 1

| Transaction Membership List | Description |
| --- | --- |
| Peer[i].KnownTxs | List of transactions known by the peer identified by i |
| Global.PooledTxs | List of transactions stored in the transaction pool |
| Global.InvalidPermanentTxs | List of permanently invalid transactions |
| Global.InvalidTemporaryTxs | List of temporarily invalid transactions |

The blockchain node according to an embodiment may have a peer[i].KnownTxs membership list. Whenever the entire transaction ((a) in FIG. 1) or transaction hash ((b) in FIG. 1) is known from peers that can be identified by i (e.g., an $i^{th}$ peer or a peer identified through identifier i), the hash value of the transaction may be added to the Peer[i].KnownTxs membership list. This membership list may be a list of known transactions known to the peer identified by i. The blockchain node may determine whether a newly received transaction needs to be delivered to the peer identified by i (i.e., whether the peer identified by i already knows about the newly received transaction) by using the membership list.

A blockchain node according to an embodiment may have a Global.PooledTxs membership list. The Global.PooledTxs membership list may store hash values of the transactions included in the transaction pool and may be used to determine whether a specific transaction is included in the transaction pool of the blockchain node. The Global.PooledTxs membership list may be implemented through its own data structure or may be implemented as an algorithm that determines whether the specific transaction has the membership by searching the transaction pool data structure.

A blockchain node according to an embodiment may further use two transaction membership lists. Transactions determined to be invalid by the blockchain node may be stored in the Global.InvalidPermanentTxs membership list or Global.InvalidTemporaryTxs membership list depending on the reason for the invalidation of the transaction. A hash value of a transaction having a permanently invalid reason may be stored in the Global.InvalidPermanentTxs membership list and a hash value of a transaction having a temporarily invalid reason may be stored in the Global.InvalidTemporaryTxs membership list.

Referring to FIG. 2, the blockchain node according to an embodiment may verify the validity of the filtered transaction and/or block based on the membership list (S120). According to an embodiment, the validity of the transaction and block may be determined as follows.

After the transaction and block are received from a peer, the blockchain node may determine the validity of the transaction and block and whether to use the transaction and block. The timing of determining the validity after the transaction and block are received and the processing of the transaction and block determined to be valid may differ depending on the blockchain system. For example, when a transaction is received on an Ethereum blockchain, the blockchain node may determine whether the received transaction is a known transaction by using the hash value of the received transaction, and when it is determined that the received transaction is a new transaction, the validity of the transaction may be verified. After that, the blockchain node may insert the transaction into the transaction pool when the transaction is verified as valid. The blockchain node may determine whether a transaction can be executed or not according to a nonce value of the transaction and when the transaction is executable, the received transaction may be inserted into the transaction pool or queue. Table 2 below shows the criteria for the blockchain node to verify the validity of the transaction.

TABLE 2

| Step | Validity criterion |
| --- | --- |
| 1 | The size of the transaction is less than the preset limit |
| 2 | The value in a value field of the transaction is not negative |
| 3 | The value in a gas field of the transaction does not exceed a block gas limit |
| 4 | The signature of the transaction is valid |
| 5 | The value in a gasPrice field of the transaction is greater than or equal to a predetermined minimum value |
| 6 | The nonce value of the transaction is not greater than the number of transactions that have occurred |
| 7 | The 'value + gas × gasPrice' value of the transaction is not less than an account balance |
| 8 | The value in the gas field of the transaction is not less than a predetermined minimum value |

In addition to the validity determination method (criteria) of the transaction and/or block of the blockchain node described above, a new validity determination criterion may be used and this is not limited here. For example, when the validity of a transaction is determined in the Ethereum blockchain, if the current transaction pool is full, other validity criteria may be applied. That is, if the gas value of a new transaction is equal to or less than the smallest gas value among transactions retained in the transaction pool, even if the transaction satisfies the criteria in Table 1, it may be determined as an invalid transaction.

In an embodiment, the blockchain node according to an embodiment may classify the transaction and/or block into different membership lists according to the reason for invalidation of the transaction and/or block (S130). For example, the blockchain node according to an embodiment, when the invalid reason of the transaction and/or block is temporary, may add the hash value of the transaction and/or block into the temporary invalid transaction membership list (Global.InvalidTemporaryTxs) (S140). Alternatively, the blockchain node according to an embodiment may add the hash value of the transaction and/or block to the permanent invalid transaction membership list (Global.InvalidPermanentTxs) when the reason for invalidation of the transaction and/or block is permanent (S150).

When a transaction is determined to be invalid as a result of the verification of the transaction, the criteria for distinguishing between permanent and temporary invalid reasons may be different for each blockchain system. For example, in the validity criteria of the transactions of the Ethereum according to Table 1, the validity criteria of steps 1, 2, 4, 5, and 8 may be a permanent invalid reasons because of the independency on a current state of the transaction and the validity criteria of steps 3, 6, and 7 may be a temporary invalid reasons because of dependency on the current state.

Since the permanent invalid transaction is likely to be determined as an invalid transaction even in future verifications, it needs to be determined prior to the reason for temporary invalidity.

FIG. 3 illustrates a pseudo code implementing a method for defending an attack using an invalid transaction or block according to an embodiment and FIG. 4 illustrates another pseudo code implementing a method for defending an attack using an invalid transaction or block according to an embodiment.

FIG. 3 shows a method for selecting a transaction to be processed through the transaction membership list when at least one transaction is received from a specific peer (Peer [i]). In FIG. 3, an activeMitigation variable may define whether it is necessary for the blockchain node to perform DDoS mitigation aggressively. The activeMitigation variable may be set to true or false by various factors. For example, the activeMitigation variable may be set to true when transactions more than the number of transactions which the blockchain node can process are continuously received or when computing resources are continuously consumed beyond a predetermined criterion.

A blockchain node according to an embodiment may reduce load required for transaction verification when the attack continuously delivering the same transactions that are not valid is in progress by using the method implemented by the pseudocode shown in FIG. 3. In order to bypass this mitigation method, the attacker should continuously generate and deliver new transactions, but since creating the new transaction consumes more computing resources than validating the transaction, it can greatly increase the burden on the attacker. This is because, when creating the transaction, a signature for the transaction is required and generating a signature of the transaction requires much more operations than verifying the signature.

Referring to FIG. 4, the load required for the transaction verification may be decreased through the use of one membership list (Global.InvalidTxs). Global.InvalidTxs membership list may include hash values of transactions that are determined to be invalid.

A blockchain node according to an embodiment may exclude a transaction included in the Global.InvalidTxs membership list from the transactions to be processed by using the pseudo code shown in FIG. 4, and the activeMitigation variable may not be used at this time. Alternatively, the blockchain node according to an embodiment may not process a transaction included in the Global.InvalidTxs membership list by using the pseudo code in FIG. 4 only when the activeMitigation is true.

As described above, according to the defense method of the denial of service attack according to an embodiment, the blockchain node may manage the transactions and/or blocks determined to be invalid as the membership lists, thereby effectively defend against denial of service attacks using invalid transactions and/or blocks.

Figure 5:
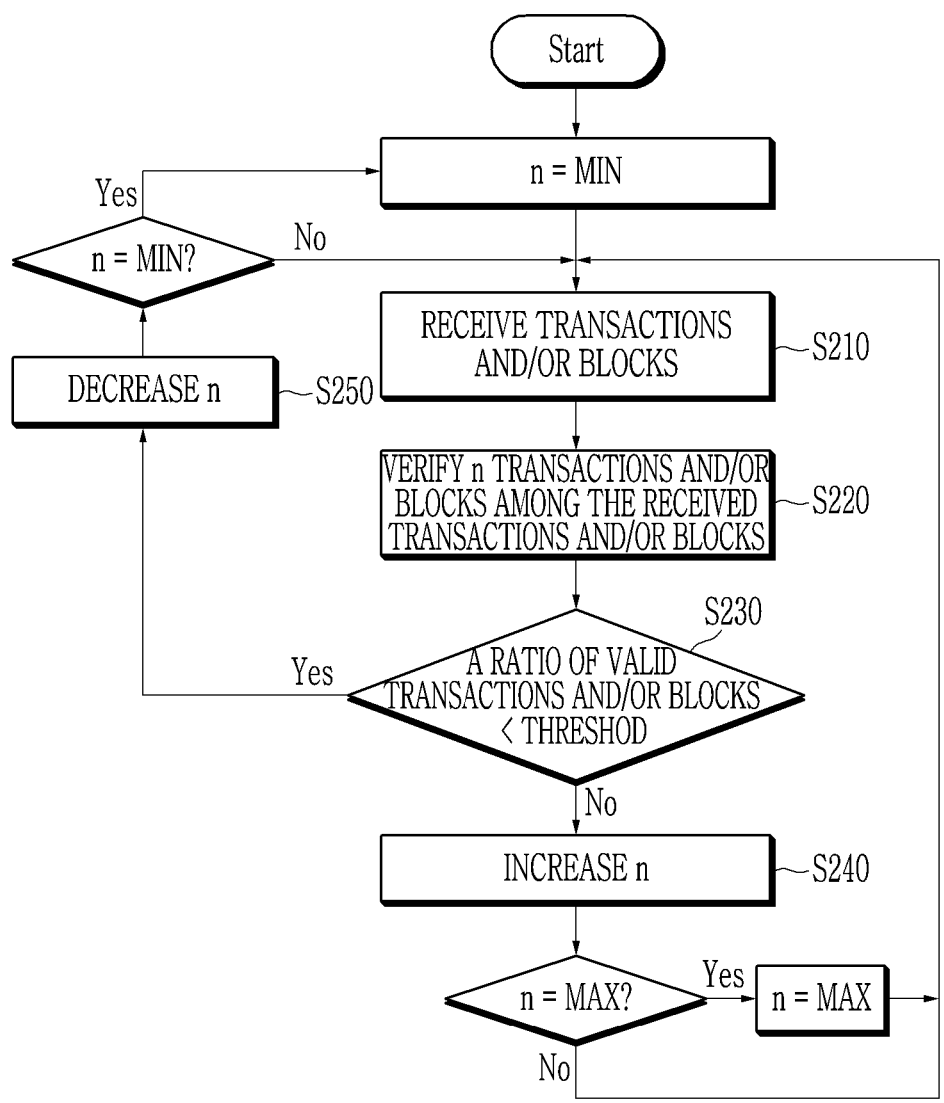
FIG. 5 is a flowchart illustrating a method for defending a service denial attack using an invalid transaction or block according to another embodiment.

FIG. 5 is a flowchart illustrating a method for defending a service denial attack using an invalid transaction or block according to another embodiment.

When many transactions or blocks are processed on a blockchain node, a large number of transactions and blocks may not be processed by limiting the number of transactions or blocks to be processed. By dynamically increasing or decreasing the number of processing limits according to the situation, each blockchain node may process more transactions and/or blocks of peers that continuously deliver valid transactions and/or blocks and may process less transactions and/or blocks of peers that continuously deliver invalid transactions and/or blocks.

FIG. 5 shows a method for determining the number (n) of transactions and/or blocks that can be processed at one time (i.e., the number of verification processes n of transactions and/or blocks). In FIG. 5, MIN may be the minimum number of processes (e.g., 1) and MAX may be the maximum number of processes. In FIG. 5, a value THRESHOLD may be a reference value that determines the increase/decrease of the number of processes and may be compared with a ratio of transactions and/or blocks verified to be valid (i.e., the valid ratio/invalid ratio of transactions and/or blocks). The threshold may be determined by various factors such as system performance, blockchain characteristic, operation policy, and historical value record. For the method for the increase/decrease of n, AIMD (Additive Increase and Multiplicative Decrease), AIAD (Additive Increase and Additive Decrease), MIAD (Multiplicative Decrease and Additive Decrease), MIMD (Multiplicate Increase and Multiplicative Decrease), etc. may be applied. The increase amount, decrease amount, increase rate, or decrease rate may also be determined by various factors such as system performance, blockchain characteristic, operation policy, record of past values, etc.

A blockchain node according to an embodiment may decrease, maintain, or increase the n using two thresholds (THRESHOLD$_1$ and THRESHOLD$_2$). A blockchain node according to an embodiment may randomly process n transactions (or blocks) among the received transactions (or blocks) or process the received sequentially first n transactions (or blocks). When n transactions (or blocks) are randomly selected, it is difficult for the attacker to predict which transaction (or block) will be selected, so the denial of service attack may be effectively attenuated.

Referring to FIG. 5, when a transaction and/or block is received (S210), the blockchain node may verify n transactions and/or blocks among the received transaction and/or blocks (S220). If the ratio of valid transaction and/or blocks among n transactions and/or blocks is not less than a predetermined threshold (S230), the blockchain node may increase n to increase the number of transactions and/or blocks to be processed (S240). In an embodiment, n may be adjusted to a value equal to or not greater than MAX.

However, if the ratio of valid transactions and/or blocks is less than the predetermined threshold, the blockchain node may limit the processing power for the transactions and/or blocks by decreasing n (S250). This is because, when the ratio of transactions and/or blocks verified to be valid is smaller than the predetermined threshold, many of the transactions and/or blocks received to the blockchain node may be determined to have been received because of the network attack. In an embodiment, n may be adjusted to a value equal to or greater than MIN.

FIG. 6 shows a pseudo code implementing a method for defending an attack using an invalid transaction or block according to another embodiment.

In FIG. 6, a method for processing transactions by randomly selecting transactions while controlling transaction (or block) throughput using the AIMD method is implemented. According to the code shown in FIG. 6, when a large amount of information is received from an unknown peer, the resources required for verification of the transaction and block delivered from peers controlled by the attacker may be effectively limited by gradually increasing the amount of information accepted.

FIG. 7 shows a pseudo code implementing a method for defending an attack using an invalid transaction or block according to another embodiment.

Referring to FIG. 7, a pseudo code that can defend the denial of service attack using transaction or block is shown. According to the pseudo code, the blockchain node may filter the transactions and/or blocks received from other peers using the membership list and verify a predetermined number of transactions and/or blocks among the filtered transactions and/or blocks.

As described above, according to the defense method for the denial of service attack according to another embodiment, the blockchain node may adjust the number of verification processes of transactions and/or blocks depend on the invalid ratio (or valid ratio) of the transaction and/or block (i.e., the ratio determined as a valid), so that the service denial attacks using invalid transactions and/or blocks are effectively prevented.

Figure 8:
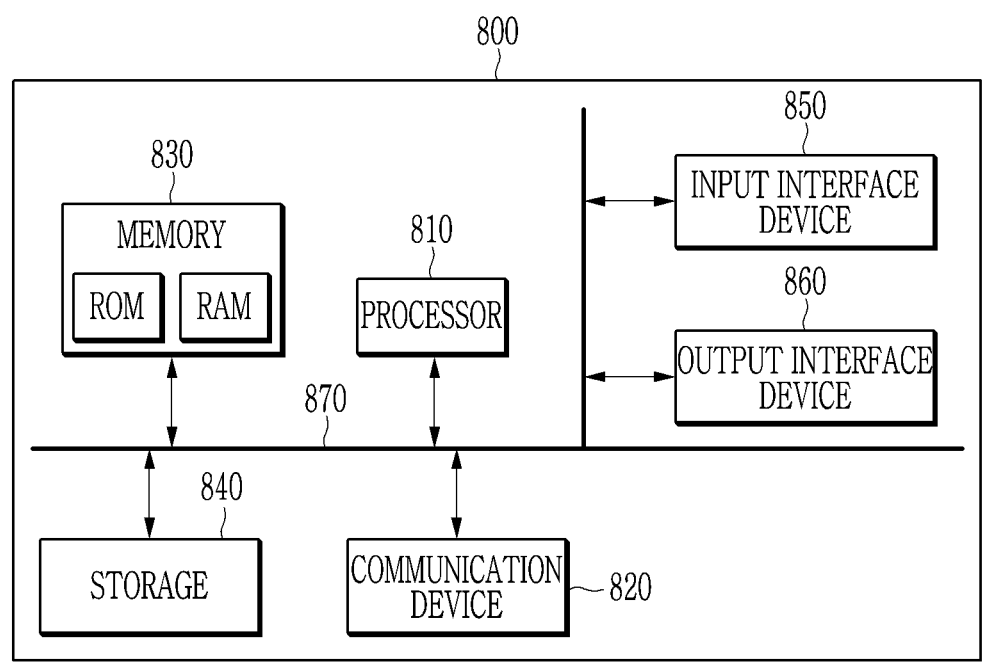
FIG. 8 is a block diagram illustrating a blockchain node according to an embodiment.

FIG. 8 is a block diagram illustrating a blockchain node according to an embodiment.

The blockchain node according to an embodiment may be implemented as a computer system, for example, a computer-readable medium. Referring to FIG. 8, the computer system 800 may include at least one of a processor 810, a memory 820, an input interface device 850, an output interface device 860, and a storage device 840 communicating through a bus 870. The computer system 800 may also include a communication device 820 coupled to the network. The processor 810 may be a central processing unit (CPU) or a semiconductor device that executes instructions stored in the memory 830 or the storage device 840. The memory 830 and the storage device 840 may include various forms of volatile or nonvolatile storage media. For example, the memory may include a read only memory (ROM) or a random-access memory (RAM).

In the embodiment of the present disclosure, the memory may be located inside or outside the processor, and the memory may be coupled to the processor through various means already known. The memory is a volatile or nonvolatile storage medium of various types, for example, the memory may include a read-only memory (ROM) or a random-access memory (RAM).

Accordingly, the embodiment may be implemented as a method implemented in the computer, or as a non-transitory computer-readable medium in which computer executable instructions are stored. In an embodiment, when executed by a processor, the computer-readable instruction may perform the method according to at least one aspect of the present disclosure.

The communication device 820 may transmit or receive a wired signal or a wireless signal.

On the contrary, the embodiments are not implemented only by the apparatuses and/or methods described so far, but may be implemented through a program realizing the function corresponding to the configuration of the embodiment of the present disclosure or a recording medium on which the program is recorded. Such an embodiment can be easily implemented by those skilled in the art from the description of the embodiments described above. Specifically, methods (e.g., network management methods, data transmission methods, transmission schedule generation methods, etc.) according to embodiments of the present disclosure may be implemented in the form of program instructions that may be executed through various computer means, and be recorded in the computer-readable medium. The computer-readable medium may include program instructions, data files, data structures, and the like, alone or in combination.

The program instructions to be recorded on the computer-readable medium may be those specially designed or constructed for the embodiments of the present disclosure or may be known and available to those of ordinary skill in the computer software arts. The computer-readable recording medium may include a hardware device configured to store and execute program instructions. For example, the computer-readable recording medium can be any type of storage media such as magnetic media like hard disks, floppy disks, and magnetic tapes, optical media like CD-ROMs, DVDs, magneto-optical media like floptical disks, and ROM, RAM, flash memory, and the like.

Program instructions may include machine language code such as those produced by a compiler, as well as high-level language code that may be executed by a computer via an interpreter, or the like.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software. The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers.

A computer program(s) may be written in any form of a programming language, including compiled or interpreted languages and may be deployed in any form including a stand-alone program or a module, a component, a subroutine, or other units suitable for use in a computing environment.

A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random-access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks.

Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium.

A processor and a memory may be supplemented by, or integrated into, a special purpose logic circuit. The processor may run an operating system 08 and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements.

For example, a processor device may include multiple processors or a processor and a controller. In addition, different processing configurations are possible, such as parallel processors. Also, non-transitory computer-readable media may be any available media that may be accessed by a computer, and may include both computer storage media and transmission media.

The present specification includes details of the number of specific implements, but it should be understood that the details do not limit any invention or what is claimable in the specification but rather describe features of the specific example embodiment.

Features described in the specification in the context of individual example embodiments may be implemented as a combination in a single example embodiment. In contrast, various features described in the specification in the context of a single example embodiment may be implemented in multiple example embodiments individually or in an appropriate sub-combination.

Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

While this disclosure has been described in connection with what is presently considered to be practical example embodiments, it is to be understood that this disclosure is not limited to the disclosed embodiments. On the contrary, it is intended to cover various modifications and equivalent arrangements included within the spirit and scope of the appended claims.

What is claimed is:

1. An apparatus for verifying validity of transactions and/or blocks, the apparatus comprising:
   a processor, a memory, and a communication device, wherein the processor executes a program stored in the memory to perform:
   verifying validity of a number of transactions and/or blocks to be processed among a plurality of transactions and/or blocks received from at least one peer in a blockchain system; and
   determining an increase or a decrease of the number of transactions and/or blocks for next validation according to a verification result of the number of transactions and/or blocks,
   wherein the processor decreases the number of transaction and/or blocks when a ratio of the valid transactions and/or blocks among the verified transactions and/or blocks is less than a predetermined threshold, or increases the number of transaction and/or blocks when the ratio of the valid transactions and/or blocks among the verified transactions and/or blocks is not less than the predetermined threshold.

2. The apparatus of claim 1, wherein the processor executes the program to further perform:
   verifying the decreased number of transactions and/or blocks; and
   determining the increase or the decrease of the decreased number according to the verification result of the decreased number of transactions and/or blocks.

3. The apparatus of claim 1, wherein the processor executes the program to further perform:
   verifying the increased number of transactions and/or blocks; and
   determining the increase or the decrease of the increased number according to the verification result of the increased number of transactions and/or blocks.

4. The apparatus of claim 1, wherein when verifying validity of the number of transactions and/or blocks among a plurality of transactions and/or blocks received from at least one peer in a blockchain system, the processor performs:
   verifying the validity of the number of transactions and/or blocks based on a plurality of predetermined validity criteria.

5. The apparatus of claim 4, wherein the plurality of predetermined validity criteria includes an independent criterion on a current state of the transactions and/or blocks and a dependent criterion on the current state of the transactions and/or blocks.

6. An apparatus for verifying validity of a transaction, the apparatus comprising:
   a processor, a memory, and a communication device, wherein the processor executes a program stored in the memory to perform:
   checking whether a transaction received from at least one peer in a blockchain system is included in a membership list; and
   verifying the transaction when the transaction is not included in the membership list,
   wherein when verifying the transaction when the transaction is not included in the membership list, the processor performs:
   verifying a number of transactions among the received transactions;
   comparing a ratio of valid transactions among the verified transactions with a predetermined threshold; and
   decreasing the number of transaction and/or blocks when a ratio of the valid transactions and/or blocks among the verified transactions and/or blocks is less than a predetermined threshold, or increasing the number of transaction and/or blocks when the ratio of the valid transactions and/or blocks among the verified transactions and/or blocks is not less than the predetermined threshold.

7. The apparatus of claim 6, wherein the membership list includes at least one of a membership list of permanently invalid transactions and a membership list of temporarily invalid transactions.

8. The apparatus of claim 7, wherein the membership list of the permanently invalid transactions includes a hash value of a transaction determined to be invalid according to an independent validity criterion on a current state of the transaction.

9. The apparatus of claim 7, wherein the membership list of the temporarily invalid transactions includes a hash value of a transaction determined to be invalid according to a dependent validity criterion on a current state of the transaction.

* * * * *